(12) United States Patent
Nozaki

(10) Patent No.: US 11,498,502 B2
(45) Date of Patent: Nov. 15, 2022

(54) VEHICLE PIPE HOLDER

(71) Applicant: TOYODA GOSEI CO., LTD., Kiyosu (JP)

(72) Inventor: Kojiro Nozaki, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 181 days.

(21) Appl. No.: 16/783,235

(22) Filed: Feb. 6, 2020

(65) Prior Publication Data

US 2020/0290537 A1 Sep. 17, 2020

(30) Foreign Application Priority Data

Mar. 15, 2019 (JP) .............................. JP2019-049156

(51) Int. Cl.
*B60R 16/08* (2006.01)
(52) U.S. Cl.
CPC .................................... *B60R 16/08* (2013.01)
(58) Field of Classification Search
CPC .. B60R 16/08; F16L 5/00; F16L 3/223; F16L 3/00; F16L 3/22; F16L 3/243; H02G 3/22; H02G 3/30; A61M 5/1418; H05G 3/22; F16B 2/20
USPC ......... 248/49, 50, 55, 56, 57, 65, 67.5, 67.7, 248/68.1, 69, 70, 71, 73, 74.2, 74.3, 74.4, 248/74.5, 686, 220.21, 222.51, 223.31, 248/223.41, 224.61, 224.8, 225.11, 316.1, 248/316.7
See application file for complete search history.

(56) References Cited

U.S. PATENT DOCUMENTS 5,060,810 A * 10/1991 Jones .................... A47F 7/0035
211/59.4
5,460,342 A * 10/1995 Dore ....................... F16L 3/223
248/68.1

(Continued)

FOREIGN PATENT DOCUMENTS

EP 0599662 A1 1/1994
JP UMH06045184 A1 11/1992

(Continued)

OTHER PUBLICATIONS

Office Action dated Mar. 15, 2022 in connection with corresponding JP Patent Application No. 2019-049156 (and Machine Translation).

*Primary Examiner* — Christopher Garft
*Assistant Examiner* — Michael McDuffie
(74) *Attorney, Agent, or Firm* — Posz Law Group, PLC

(57) ABSTRACT

A vehicle pipe holder configured to hold two or more pipes in a vehicle, the vehicle pipe holder includes: a holding member that is made of resin and that includes a first holding portion configured to hold one of the pipes, a second holding portion configured to hold another one of the pipes, and a holding connection portion that couples the first holding portion and the second holding portion; and a mounting bracket that is made of metal, that is separate from the holding member, and that includes a vehicle mounting portion configured to be mounted to a vehicle and an insertion opening configured to be inserted with the holding connection portion. The mounting bracket is configured to be disposed between the first holding portion and the second holding portion upon assembly of the holding member and the mounting bracket.

9 Claims, 4 Drawing Sheets

(56) References Cited

U.S. PATENT DOCUMENTS

| | | | | | |
|---|---|---|---|---|---|
| 5,765,787 | A * | 6/1998 | de Beers | ............... | F16L 3/13 248/316.7 |
| 5,957,415 | A * | 9/1999 | Perea | ............... | F16L 55/035 248/58 |
| 7,055,784 | B2 * | 6/2006 | Stigler | ............... | B60R 16/0215 24/16 PB |
| 7,267,307 | B2 * | 9/2007 | Bauer | ............... | F16L 3/223 248/65 |
| 7,387,282 | B2 * | 6/2008 | Kovac | ............... | F16L 3/237 248/65 |
| 8,844,955 | B2 * | 9/2014 | Fulton | ............... | F16D 55/00 280/124.116 |
| 8,870,131 | B2 * | 10/2014 | Gotou | ............... | H02G 3/32 248/65 |
| 8,967,556 | B2 * | 3/2015 | Meyers | ............... | B60R 16/0215 248/74.1 |
| 2005/0011996 | A1 * | 1/2005 | Geater | ............... | H02G 3/30 248/71 |
| 2006/0249636 | A1 * | 11/2006 | Thiedig | ............... | F16L 3/237 248/74.4 |
| 2006/0273226 | A1 * | 12/2006 | Jatzke | ............... | F16L 3/223 248/68.1 |
| 2007/0018057 | A1 * | 1/2007 | Kovac | ............... | F16L 3/1025 248/68.1 |
| 2010/0294896 | A1 * | 11/2010 | Sayilgan | ............... | F16B 21/073 248/73 |
| 2014/0008501 | A1 * | 1/2014 | Satou | ............... | B60R 13/0206 248/68.1 |
| 2014/0091182 | A1 * | 4/2014 | Fukumoto | ............... | F16L 3/2235 248/68.1 |
| 2014/0299723 | A1 * | 10/2014 | Kato | ............... | F16L 3/1222 248/74.4 |
| 2016/0040822 | A1 * | 2/2016 | Cetnar | ............... | B60T 17/046 29/428 |
| 2016/0178089 | A1 * | 6/2016 | Yadav | ............... | H02G 3/32 248/73 |
| 2016/0178090 | A1 * | 6/2016 | Schilling | ............... | H02G 3/32 248/68.1 |
| 2019/0145551 | A1 * | 5/2019 | Schwalbe | ............... | F16L 3/2235 248/67.5 |

FOREIGN PATENT DOCUMENTS

| | | | |
|---|---|---|---|
| JP | 2002-354637 A | 12/2002 | |
| JP | 2011-133003 A | 7/2011 | |
| JP | 2011133003 A * | 7/2011 | ............ F16L 3/2235 |

* cited by examiner

VEHICLE PIPE HOLDER

CROSS-REFERENCE TO RELATED APPLICATION(S)

This application is based upon and claims the benefit of priority from prior Japanese patent application No. 2019-049156 filed on Mar. 15, 2019, the entire contents of which are incorporated herein by reference.

BACKGROUND

1. Field of the Invention

The present invention relates to a vehicle pipe holder for holding two or more pipes in a vehicle.

2. Description of the Related Art

Various fluids including fuel are introduced into a vehicle. Accordingly, various pipes serving as flow paths of these fluids are disposed in the vehicle. These pipes are held in the vehicle so as to be prevented from interfering with each other and interfering with other members.

JP-A-2011-133003 discloses a pipe holder for holding a pipe on a vehicle body side member. The pipe holder holds the pipe on the vehicle body side member with: a holder body that is made of resin and that holds the pipe; and a mounting bracket that is made of metal, that is attached to the holder body, and that supports the pipe.

In JP-A-2011-133003, two pipes P1 and P2 are held on the vehicle body side member BM by the pipe holder. According to the pipe holder of JP-A-2011-133003, the pipes P1 and P2 are held by the holder body made of resin, and the holder body is mounted to the vehicle body side member BM with the mounting bracket made of metal. According to the pipe holder of JP-A-2011-133003, the holder body, which directly holds the pipes P1 and P2, can be formed with a small dimensional error, and a weight of the pipes held by the holder body can be bore by the mounting bracket made of metal, which has high rigidity.

Meanwhile, in recent years, a demand of size reduction of various devices and members mounted on a vehicle is increasing, and further size reduction of a vehicle pipe holder is demanded.

SUMMARY

The present invention has been made in view of the above circumstances, and an object thereof is to achieve size reduction of a vehicle pipe holder for holding two or more pipes in a vehicle.

According to an aspect of the present invention, there is provided a vehicle pipe holder configured to hold two or more pipes in a vehicle, the vehicle pipe holder including: a holding member that is made of resin and that includes a first holding portion configured to hold one of the pipes, a second holding portion configured to hold another one of the pipes, and a holding connection portion that couples the first holding portion and the second holding portion; and a mounting bracket that is made of metal, that is separate from the holding member, and that includes a vehicle mounting portion configured to be mounted to a vehicle and an insertion opening configured to be inserted with the holding connection portion, wherein the mounting bracket is configured to be disposed between the first holding portion and the second holding portion upon assembly of the holding member and the mounting bracket.

The vehicle pipe holder of the present invention is small in size.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
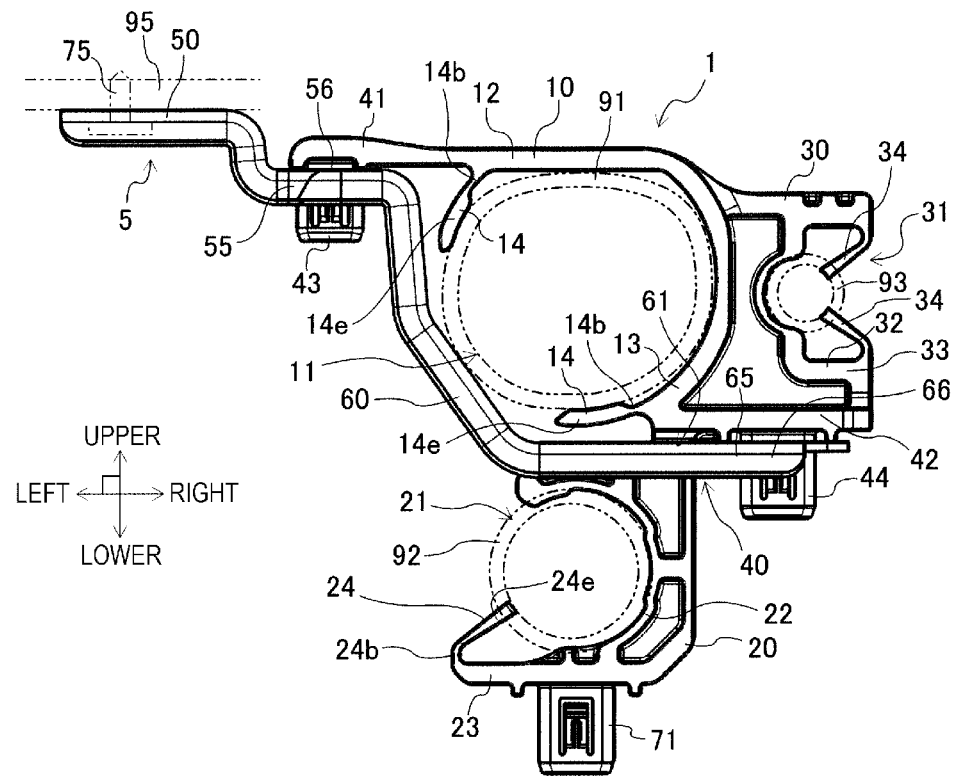
FIG. 1 is an explanatory view schematically showing a state in which a holding member and a mounting bracket in a vehicle pipe holder according to Embodiment 1 are assembled.

Hereinafter, a vehicle pipe holder of the present invention will be described in detail. Unless otherwise specified, numerical ranges "x to y" in the present description include the lower limit x and the upper limit y. A numerical range may be constituted by any combination of these upper and lower limits, as well as numerical values listed in the embodiments. Any numerical value selected from the numerical ranges can be used as the upper limit and the lower limit.

The vehicle pipe holder of the present invention includes a holding member made of resin and a mounting bracket made of metal.

In the vehicle pipe holder of the present invention, a first holding portion and a second holding portion of the holding member made of resin each hold one pipe, thereby bundling two or more pipes together. The holding member and the two or more pipes are mounted to the vehicle body by the mounting bracket made of metal disposed between the first holding portion and the second holding portion. The mounting bracket disposed between the first holding portion and the second holding portion also functions as a core member that reinforces the entire vehicle pipe holder between the at least two pipes. Therefore, the vehicle pipe holder according to the present invention can stably hold two or more pipes and has a small size.

Hereinafter, each part of the vehicle pipe holder of the present invention will be described.

The holding member includes a first holding portion, a second holding portion, and a holding connection portion.

The vehicle pipe holder of the present invention is a holder for holding two or more pipes in a vehicle. Therefore, the vehicle pipe holder of the present invention holds one of the two or more pipes with the first holding portion of the holding member, and holds another one of the two or more pipes with the second holding portion. The first holding portion and the second holding portion are connected by the holding connection portion. Therefore, the parts of the holding member are arranged in an order of the first holding portion—the holding connection portion—the second holding portion.

Needless to say, the holding member of the vehicle pipe holder of the present invention may further include a third holding portion, a fourth holding portion, and the like for holding others pipes in addition to the first holding portion, the holding connection portion, and the second holding portion. In this case, the third holding portion and the like may be connected to the first holding portion and the second holding portion by the holding connection portion, without being limited thereto. For example, the third holding portion and the like may be directly integrated with the first holding portion or the second holding portion. Alternatively, the third holding portion and the like may be connected to any one of the first holding portion, the holding connection portion, and the second holding portion by a connection portion other than the holding connection portion.

The holding member may be a single member, or may be obtained by integrating two or more separate bodies.

As described above, the first holding portion and the second holding portion each hold a separate pipe. Hereinafter, the pipe held by the first holding portion may be referred to as a first pipe, as necessary. Similarly, the pipe held by the second holding portion may be referred to as a second pipe.

The first holding portion may be any shape capable of holding the first pipe. Specifically, the first holding portion preferably has an ended or endless annular shape. The annular first holding portion can hold the first pipe within a ring thereof. Here, the annular shape is not limited to a circular outer shape, or may be a polygonal shape having three or more sides, or an irregular shape.

In view of workability of holding the first pipe, the first holding portion preferably has an ended annular shape, that is, a C-like annular shape having a slit in a peripheral wall thereof. The slit of the peripheral wall in the first holding portion is referred to as a first slit.

In the first holding portion having the C-like annular shape, and inside and an outside of the ring are communicated by the first slit in the peripheral wall of the first holding portion. Therefore, when the first pipe is held by the first holding portion, the first slit can be used as an insertion opening for the first pipe.

The first holding portion may have an endless annular shape. For example, the holding member may be formed of two parts, and each part may be provided with a semi-annular portion constituting a part of the first holding portion. In this case, by integrating the two parts with the first pipe interposed therebetween, the first pipe can be held inside the ring of the first holding portion while forming the first holding portion having the endless annular shape.

For example, when an end portion of the first pipe is held by the first holding portion, the holding member may be one member, and the first holding portion may have an endless annular shape. In this case, when the first pipe is held by the first holding portion, the first pipe may simply be inserted into the ring of the first holding portion.

Similarly to the first holding portion, the second holding portion may have an endless annular shape or an ended annular shape.

A type of the resin used for the holding member is not particularly limited, and only one type of resin material may be used, or two or more types of resin materials may be used in combination.

Examples of suitable resin materials for the holding member include polyacetal (POM), polypropylene (PP), polyethylene terephthalate (PET), polytetrafluoroethylene (PTFE), and acrylonitrile-butadiene-styrene copolymer synthetic resin (ABS).

Among these, when a resin material having excellent sliding properties such as polyacetal is used, wear of the holding member by the mounting bracket is prevented, and durability of the vehicle pipe holder of the present invention is improved.

As necessary, various types of blending materials such as a coloring material and a reinforcing fiber material may be blended in the resin material. Furthermore, another member may be integrated with the holding member. Examples of the other member include a cushion material made of an elastic material such as rubber, a biasing member such as a leaf spring, and the like. The other member may be fixedly bonded and integrated with the holding member by a method such as adhesion, or may be integrated when the holding member is molded by a method such as insert molding.

Although the shape of the holding connection portion is not particularly limited, the holding connection portion needs to have such a length that can be inserted into the insertion opening of a mounting bracket to be described later, that is, about a thickness of the mounting bracket. The length of the holding connection portion refers to a length of a portion of the holding connection portion that connects the first holding portion and the second holding portion, and can be rephrased as a distance between the first holding portion and the second holding portion.

In the vehicle pipe holder of the present invention, the first pipe and the second pipe are held by the first holding portion and the second holding portion of the holding member, and the mounting bracket made of metal is interposed between the first pipe and the second pipe. Therefore, the mounting bracket of the vehicle pipe holder of the present invention can support the first pipe and the second pipe in the vicinity thereof, and even when the first pipe and the second pipe are slightly displaced or deformed during travel and the like, the mounting bracket can stably support the first pipe and the second pipe.

The shorter the length of the holding connection portion, the closer the first pipe and the second pipe are located closer to each other and closer to the mounting bracket. Therefore, if the length of the holding connection portion is short, an allowable amount of displacement or amount of deformation of the first pipe and the second pipe is small, and a force acting on the mounting bracket due to the displacement of the first pipe and the second pipe is also reduced. If the force acting on the mounting bracket is small, even if a force in a direction away from the vehicle, for example, a moment in a twisting direction around a vehicle mounting portion (to be described later) of the mounting bracket acts with respect to the mounting bracket, the first pipe and the second pipe are stably held in the vehicle by the vehicle pipe holder of the present invention.

If the length of the holding connection portion is short, it is necessary to reduce the thickness of the mounting bracket. Therefore, in view of rigidity and strength of the mounting bracket, the length of the holding connection portion is preferably long to some extent. On the other hand, in consideration of stability when the first pipe and the second pipe are held by the vehicle pipe holder of the present invention, it is considered that the first pipe and the second pipe are preferably held at positions close to each other. Considering this, the length of the holding connection portion is preferably short. Preferable ranges of the length of the holding connection portion in consideration of both include 1 mm to 15 mm, 1.5 mm to 10 mm, and 2 mm to 6.5 mm.

The mounting bracket is made of metal, is separate from the holding member described above, and is assembled with the holding member when used.

The mounting bracket simply needs to include a vehicle mounting portion mounted to the vehicle and an insertion opening to be inserted with the holding connection portion, and a shape thereof is not particularly limited. The mounting bracket may be, for example, a casting, or may be a metal plate that is bent as necessary. In view of weight reduction, the mounting bracket is preferably a metal plate that is bent.

The thickness of the mounting bracket is not particularly limited, but from the viewpoint of securing sufficient rigidity and strength and achieving weight reduction, preferable ranges of the thickness of the mounting bracket include 1 mm to 15 mm, 1.5 mm to 10 mm, and 2 mm to 6.5 mm.

The vehicle mounting portion of the mounting bracket is a portion mounted to the vehicle, and may have such shape that can be directly or indirectly mounted to the vehicle. For example, the vehicle mounting portion may have a clip shape or a through hole shape through which a bolt or a screw is inserted.

The holding connection portion of the holding member is inserted into the insertion opening of the mounting bracket. Therefore, the insertion opening needs to be large enough to accommodate the holding connection portion therein. A peripheral portion of the insertion opening in the mounting bracket may have an ended annular shape or may have an endless annular shape. That is, the insertion opening may be an opening having a slit communicating with the outside or a simple opening separated from the outside.

When the peripheral portion of the insertion opening in the mounting bracket has an ended annular shape, that is, when the insertion opening has a slit, upon assembly of the holding member and the mounting bracket, the holding connection portion of the holding member is accommodated in the insertion opening through the slit. Therefore, when the peripheral portion of the insertion opening has an ended annular shape, the holding member and the mounting bracket can be easily assembled.

When the peripheral portion of the insertion opening of the mounting bracket has an endless annular shape, the peripheral portion of the insertion opening has a continuous annular shape over the entire circumference of the insertion opening, and the insertion opening is separated from the outside at the peripheral portion thereof. In this case, upon assembly of the holding member and the mounting bracket, the first holding portion or the second holding portion of the holding member is inserted into the insertion opening to accommodate the holding connection portion in the insertion opening. In this case, upon use such that the first pipe and the second pipe are held in the vehicle by the vehicle pipe holder of the present invention, the holding member is unlikely to be detached from the mounting bracket, so that the first pipe and the second pipe can be stably held in the vehicle by the vehicle pipe holder of the present invention.

In this case, in order to insert the first holding portion or the second holding portion of the holding member into the insertion opening upon the assembly, the insertion opening needs to be large enough to accommodate the first holding portion or the second holding portion therein.

The mounting bracket may simply accommodate the holding connection portion in the insertion opening between the first holding portion and the second holding portion, but also may hold the first pipe together with the first holding portion. For example, when the first holding portion has the C-like annular shape having the first slit in the peripheral wall as described above, the mounting bracket may have a peripheral wall cover portion that covers the first slit. In this case, an outer shape of the first holding portion can be made small, and further size reduction of the vehicle pipe holder of the present invention can be achieved.

When the first holding portion of the holding member has the first slit and the mounting bracket has the peripheral wall cover portion, in order to stably hold the first pipe with the mounting bracket as well, the peripheral wall cover portion is preferably fixed to the holding member. Specifically, in this case, the holding member and the mounting bracket are preferably fixed to each other in the vicinity of the first slit of the holding member and the peripheral wall cover portion of the mounting bracket, and are more preferably fixed to each other at two positions between which the first slit of the holding member and the peripheral wall cover portion of the mounting bracket are interposed. A method for fixing the holding member and the mounting bracket in this case is not particularly limited, and both may be permanently fixed so as not to be detachable, or may be reversibly fixed so as to be detachable. In this case, examples of the method for fixing the holding member and the mounting bracket include engagement, fitting, bonding, welding, and the like.

The mounting bracket of the vehicle pipe holder of the present invention does not necessarily include the peripheral wall cover portion, and the mounting bracket may not include the peripheral wall cover portion even when the first holding portion has the above-described C-like annular shape.

The mounting bracket simply needs to be made of metal, and a type of the metal used for the mounting bracket is not particularly limited. The metal used for the mounting bracket may be formed of a single metal element, or may be an alloy containing two or more types of metal elements. The mounting bracket may be subjected to surface treatment such as plating and painting.

Examples of suitable metal materials for the mounting bracket include stainless steel, iron, aluminum, titanium, and the like.

Hereinafter, the vehicle pipe holder of the present invention will be described by way of specific examples.

Embodiment 1

A vehicle pipe holder according to Embodiment 1 is a member for holding three pipes arranged below a vehicle body of the vehicle.

Figure 2:
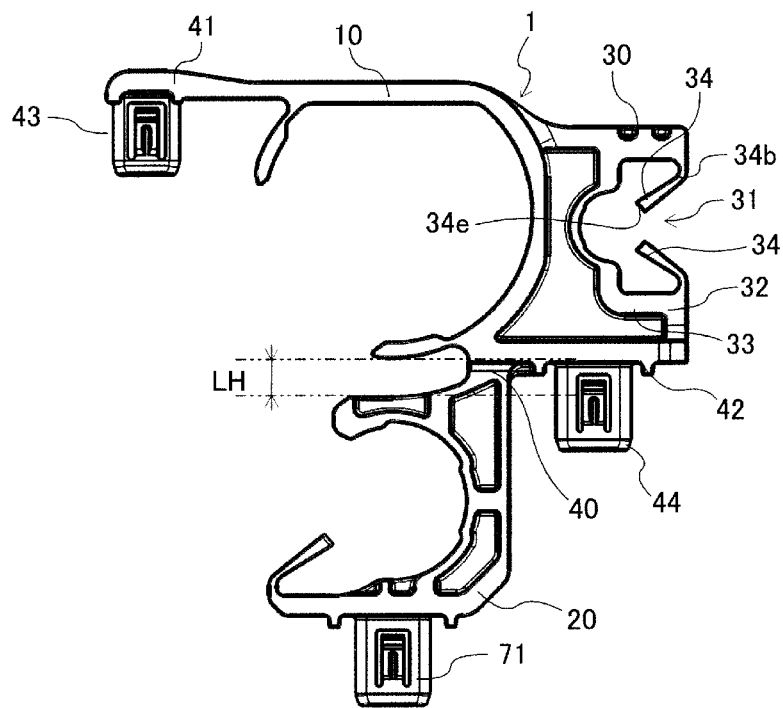
FIG. 2 is an explanatory view schematically showing the holding member in the vehicle pipe holder according to Embodiment 1.
Figure 3:
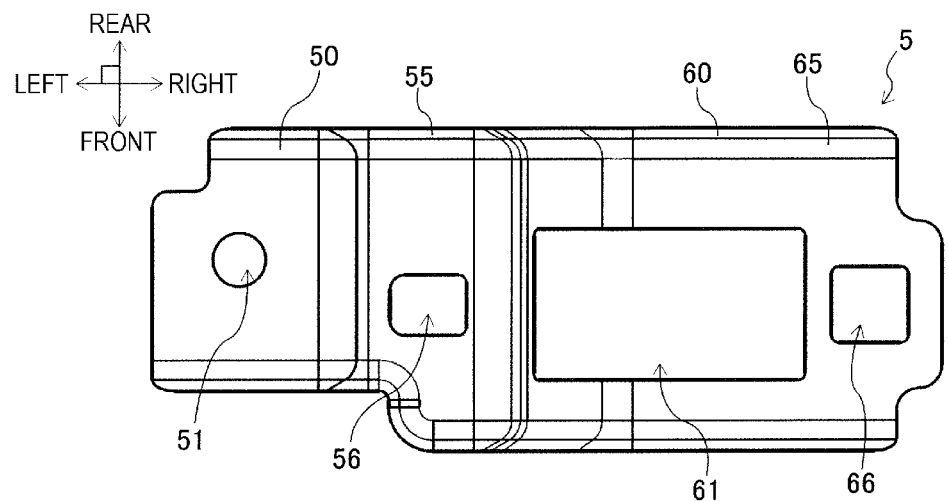
FIG. 3 is an explanatory view schematically showing the mounting bracket in the vehicle pipe holder according to Embodiment 1.
Figure 4:
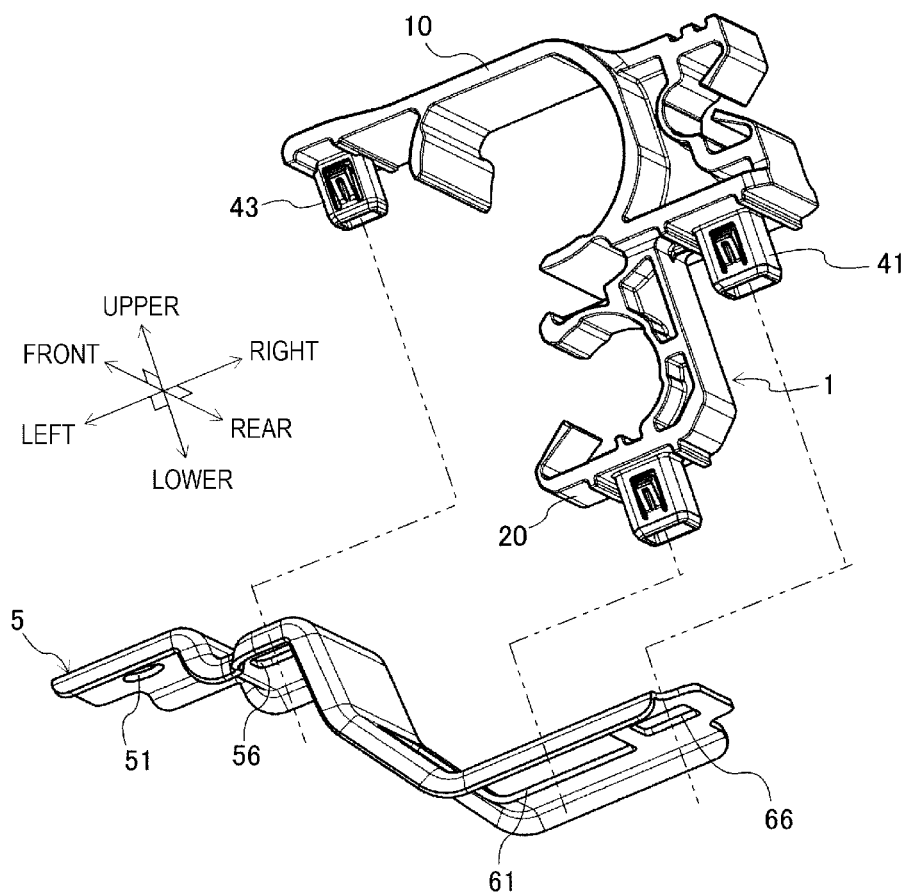
FIG. 4 is an explanatory view schematically showing a state in which a holding member and a mounting bracket in a vehicle pipe holder according to Embodiment 1 are being assembled.

FIG. 1 is an explanatory view schematically showing a state in which a holding member and a mounting bracket in the vehicle pipe holder according to Embodiment 1 are assembled. FIG. 2 is an explanatory view schematically showing the holding member in the vehicle pipe holder according to Embodiment 1, and FIG. 3 is an explanatory view schematically showing the mounting bracket in the vehicle pipe holder according to Embodiment 1. FIG. 4 is an explanatory view schematically showing a state in which a holding member and a mounting bracket in a vehicle pipe holder according to Embodiment 1 are being assembled.

Hereinafter, in Embodiment 1, upper, lower, left, right, front, and rear respectively mean upper, lower, left, right, front, and rear shown in the drawings.

As shown in FIG. 1, the vehicle pipe holder according to Embodiment 1 includes a holding member 1 and a mounting bracket 5, and is obtained by assembling the holding member 1 and the mounting bracket 5.

The holding member 1 is made of POM, and as shown in FIGS. 1 and 2, includes a first holding portion 10, a second holding portion 20, a holding connection portion 40, a third holding portion 30, a first assembling base portion 41, a second assembling base portion 42, a first engaging claw 43, a second engaging claw 44, and an other member engaging claw 71.

As shown in FIG. 1, the first holding portion 10 is a portion that holds the first pipe 91 inside the ring, and has a substantially C-like annular shape having a first slit 11 in a peripheral wall thereof. The first slit 11 is located on a left side and a lower side of the first holding portion 10.

The peripheral wall of the first holding portion 10 is referred to as a first peripheral wall 12. The first peripheral wall 12 includes a first general portion 13 and two first elastic contact portions 14. The two first elastic contact portions 14 are respectively portions of the first peripheral wall 12 adjacent to both end portions in the circumferential direction of the first slit 11, and the first general portion 13 is the other portion of the first peripheral wall 12.

The two first elastic contact portions 14 are formed continuously with the first general portion 13 and have a fin shape curved in a substantially arc shape. Each first elastic contact portion 14 has a first base portion 14b that is a portion on the first general portion 13 side and a first end portion 14e that is a portion on the first slit 11 side. A thickness of the first base portion 14b of each first elastic contact portion 14 is smaller than a thickness of the first end portion 14e. Therefore, each first elastic contact portion 14 can be elastically deformed with the first base portion 14b as a boundary.

As shown in FIG. 1, to hold the first pipe 91, the first elastic contact portions 14 are elastically deformed, and the first holding portion 10 is slightly expanded. The first holding portion 10 grips the first pipe 91 via elasticity of the first elastic contact portions 14.

The second holding portion 20 is a portion that holds the second pipe 92 inside the ring, and has a substantially C-like annular shape having a second slit 21 in a peripheral wall thereof The second holding portion 20 is located below the first holding portion 10, and the second slit 21 is located on the left side in the second holding portion 20.

The peripheral wall of the second holding portion 20 is referred to as a second peripheral wall 22. The second peripheral wall 22 includes a second general portion 23 and one second elastic contact portion 24. The second elastic contact portion 24 is a portion of the second peripheral wall 22 that is adjacent to an end portion farther from the first holding portion 10 among two end portions in the circumferential direction of the second slit 21.

The second general portion 23 is the other portion of the second peripheral wall 22. The second elastic contact portion 24 has a shape bent back toward an inside of the second holding portion 20, and has a second base portion 24b that is a portion on the second general portion 23 side, and a second end portion 24e that is a portion on the second slit 21 side and that is bent back toward the second general portion 23.

A thickness of the second base portion 24b of the second elastic contact portion 24 is smaller than a thickness of the second end portion 24e, and the second elastic contact portion 24 can also be elastically deformed with the second base portion 24b as a boundary.

When the second pipe 92 is held by the second holding portion 20, the second elastic contact portion 24 is in a folded state, and presses the second pipe 92 in a direction away from the second elastic contact portion 24, that is, toward the first pipe 91, due to an elastic return force of the second elastic contact portion 24.

As shown in FIG. 2, the holding connection portion 40 is located between the first holding portion 10 and the second holding portion 20, and connects the first holding portion 10 and the second holding portion 20. In Embodiment 1, a length LH of the holding connection portion 40 is 5 mm, and the first holding portion 10 and the second holding portion 20 are located close to each other.

As shown in FIG. 1, the third holding portion 30 is a part that holds a third pipe 93 inside the ring, and is integrated with the right side of the first holding portion 10 as shown in FIGS. 1 and 2. In the vehicle pipe holder according to Embodiment 1, the first holding portion 10 and the third holding portion 30 are positioned on the upper side of the mounting bracket 5 to be described later, and the second holding portion 20 is positioned below the mounting bracket 5.

The third holding portion 30 has a substantially C-like annular shape having a third slit 31 in a peripheral wall thereof. The peripheral wall of the third holding portion 30 is referred to as a third peripheral wall 32. The third peripheral wall 32 includes a third general portion 33 and two third elastic contact portions 34. The third elastic contact portions 34 are respectively adjacent to both end portions in the circumferential direction of the third slit 31 of the third peripheral wall 32.

The two third elastic contact portions 34 each have a shape bent back toward an inside of the third holding portion 30, and each have a third base portion 34b that is a portion on the third general portion 33 side, and a third end portion 34e that is a portion on the third slit 31 side and that is bent back toward the third general portion 33. A thickness of the third base portion 34b of the third elastic contact portions 34 is smaller than a thickness of the third end portion 34e, and the third elastic contact portion 34 can also be elastically deformed with the third base portion 34b as a boundary.

When the third pipe 93 is held by the third holding portion 30, the third elastic contact portions 34 are in a folded state. The third pipe 93 is gripped by the two third elastic contact portions 34 due to an elastic return force of the third elastic contact portions 34.

The first assembling base portion 41 is integrated with the first holding portion 10, and the second assembling base portion 42 is integrated with the first holding portion 10 and the third holding portion 30.

The first assembling base portion 41 has a substantially plate-like shape and extends further leftward from the upper end portion and the left end portion of the first holding portion 10, that is, toward a mounting end portion 95 shown in FIG. 1. The first engaging claw 43 having a claw shape protruding downward is provided on the first assembling base portion 41.

The second assembling base portion 42 has a substantially plate shape and bridges between a lower end of the first holding portion 10 and a lower end of the third holding portion 30. The second engaging claw 44 having a claw shape protruding downward is provided on the second assembling base portion 42.

Further, the other member engaging claw 71 having a claw shape protruding downward is provided on a lower end portion of the second holding portion 20. The first engaging claw 43, the second engaging claw 44, and the other member engaging claw 71 have substantially the same shape and protrude in substantially the same direction.

The mounting bracket 5 is separate from the holding member 1, made of stainless steel, and has a substantially plate shape as shown in FIGS. 1 and 3. The mounting bracket 5 includes a vehicle mounting portion 50, a first assembling portion 55, a peripheral wall cover portion 60, and a second assembling portion 65.

The vehicle mounting portion 50 has a substantially flat plate shape extending in the left-right direction, and has a mounting hole 51 penetrating the vehicle mounting portion 50 in a thickness direction thereof as shown in FIG. 3.

As shown in FIG. 1, the pipe holder according to Embodiment 1 is mounted to the mounting end portion 95 of the vehicle via a screw 75 inserted into the mounting hole 51 of the vehicle mounting portion 50.

As shown in FIGS. 1 and 4, the first assembling portion 55 has a substantially L-like plate shape, and is continuous to the right side of the vehicle mounting portion 50 and forms a stepped shape that is one step lower than the vehicle mounting portion 50.

Further, as shown in FIG. 4, the mounting bracket 5 has a substantially U-shaped cross section that is bent in the front-rear direction as well. Therefore, a strength in a longitudinal direction of the mounting bracket 5, that is, the front-rear direction, is further enhanced. A thickness (plate thickness) of the mounting bracket 5 is 5 mm.

As shown in FIGS. 3 and 4, the first assembling portion 55 has a first engaging hole 56 penetrating the first assembling portion 55 in a thickness direction thereof.

As shown in FIG. 1, the peripheral wall cover portion 60 has a curved or bent shape that is continuous to the right side of the first assembling portion 55, and that first extends downward from the first assembling portion 55 and then extends rightward. As shown in FIG. 3, the peripheral wall cover portion 60 has an insertion opening 61 penetrating the peripheral wall cover portion 60 in a thickness direction thereof.

As shown in FIG. 1, the second assembling portion 65 has a substantially flat plate shape that is continuous to the right side of the peripheral wall cover portion 60 and that extends further rightward. As shown in FIG. 3, the second assembling portion 65 has a second engaging hole 66 penetrating the second assembling portion 65 in a thickness direction thereof.

As shown in FIG. 3, a peripheral portion of the mounting hole 51 in the vehicle mounting portion 50, a peripheral portion of the first engaging hole 56 in the first assembling portion 55, a peripheral portion of the insertion opening 61 in the peripheral wall cover portion 60, and a peripheral portion of the second engaging hole 66 in the second assembling portion 65 each have an endless annular shape.

Upon assembly of the holding member 1 and the mounting bracket 5 shown in FIG. 1, the holding connection portion 40 of the holding member 1 is inserted into the insertion opening 61 of the mounting bracket 5, and the peripheral wall cover part 60 of the mounting bracket 5 is disposed between the first holding portion 10 and the second holding portion 20.

It can be said that the first holding portion 10 and the third holding portion 30 are disposed on an inner side of the substantially L-shaped mounting bracket 5, and the second holding portion 20 is disposed on an outer side of the mounting bracket 5. More specifically, the second holding portion 20 of the vehicle pipe holder according to Embodiment 1 hangs below the mounting bracket 5. Therefore, the mounting bracket 5 is not required to support the second holding portion 20. Thus, according to the vehicle pipe holder according to Embodiment 1, it is possible to stably hold the first holding portion 10 and the third holding portion 30, and to reduce the size of the mounting bracket 5.

Further, in the vehicle pipe holder according to Embodiment 1, the second holding portion 20 is fixed to another member (not shown) by the other member engaging claw 71. Thus, the second holding portion 20 on the outer side of the mounting bracket 5, but similar to the first holding portion 10 and the third holding portion 30, the second holding portion 20 is stably held with respect to the mounting bracket 5. In the vehicle pipe holder of the present invention, the other member engaging claw 71 is not essential. For example, by adjusting the shape and positional relationship of the portions of the pipe holder of the present invention, such as shortening the length of the holding connection portion 40, it is possible to sufficiently secure stability of the second holding portion 20 upon assembly.

Further, since the peripheral wall cover portion 60 of the mounting bracket 5 is disposed between the first holding portion 10 and the second holding portion 20, the holding member 1 is reinforced by the mounting bracket 5 between the first pipe 91 and the second pipe 92.

In this way, since the mounting bracket 5 also functions as the core member, that is, a reinforcing structure inside, the strength of the vehicle pipe holder is sufficiently ensured even without using a large mounting bracket 5, and the size of the mounting bracket 5 and the size of the entire vehicle pipe holder can be reduced.

Upon the assembly, the peripheral wall cover portion 60 of the mounting bracket 5 covers the first pipe 91 together with the first holding portion 10 from the outer side in the radial direction.

More specifically, as described above, the first holding portion 10 has the first slit 11 located on the left side and the lower side of the first holding portion 10. The mounting bracket 5 is disposed between the first holding portion 10 and the second holding portion 20, and the peripheral wall cover portion 60 of the mounting bracket 5 is disposed on the left side and the lower side of the first slit 11. Therefore, it can be said that the peripheral wall cover portion 60 covers the first slit 11 on a radially outer side of the first pipe 91, or the peripheral wall cover portion 60 holds the first pipe 91 together with the first holding portion 10.

This enables to reduce the size of the first holding portion 10 and to stably hold the first pipe 91, as compared with the case where the first pipe 91 is held only by the first holding portion 10 made of resin.

The first engaging claw 43 and the second engaging claw 44 protrude downward in FIG. 1. Therefore, as shown in FIG. 4, the first engaging claw 43 is inserted into the first engaging hole 56 of the mounting bracket 5 downward from above, and the second engaging claw 44 is inserted into the second engaging hole 66 of the mounting bracket 5 downward from above as well. Here, since the upper-lower direction shown the drawings coincides with a vertical direction, the first engaging claw 43 engaged with the first engaging hole 56 is pressed downward, that is, in an engagement direction with the first engaging hole 56, by a weight of the holding member 1. Similarly, the second engaging claw 44 engaged with the second engaging hole 66 is pressed in an engagement direction with the second engaging hole 66. Therefore, according to the vehicle pipe holder according to Embodiment 1, the holding member 1 and the mounting bracket 5 are firmly assembled, and the first pipe 91 and the second pipe 92 can be held more stably. That is, according to the vehicle pipe holder according to Embodiment 1, both a stable holding function of the pipe and size reduction of the vehicle pipe holder are achieved at a high level.

As shown in FIG. 1, the vehicle pipe holder according to Embodiment 1 is screw fastened upward from below with respect to the mounting end portion 95 of the vehicle. This mounting direction coincides with an engagement direction between the first engaging claw 43 and the first engaging hole 56 and an engagement direction of the second engaging claw 44 and the second engaging hole 66. That is, when the vehicle pipe holder according to Embodiment 1 is mounted to the mounting end portion 95 of the vehicle, engagement between the first engaging claw 43 and the first engaging hole 56 and engagement between the second engaging claw 44 and the second engaging hole 66 are both reinforced. Accordingly, the holding member 1 and the mounting bracket 5 in the vehicle pipe holder according to Embodiment 1 are firmly assembled, which enables further size reduction of the vehicle pipe holder according to Embodiment 1.

Since the holding member 1 and the mounting bracket 5 are assembled due to engagement between the first engaging hole 56 and the first engaging claw 43 and engagement between the second engaging hole 66 and the second engaging claw 44, in the vehicle pipe holder according to Embodiment 1, the holding member 1 and the mounting bracket 5 are fixed to each other at two positions between which the first slit 11 and the peripheral wall cover portion 60 are interposed. This enables to hold the first pipe 91 more stably with the peripheral wall cover portion 60 and the first holding portion 10.

An outer diameter of the first pipe 91 is the largest among the three pipes held by the vehicle pipe holder according to Embodiment 1, that is, the first pipe 91, the second pipe 92, and the third pipe 93. In the vehicle pipe holder according to Embodiment 1, the first holding portion 10, which holds the first pipe 91, is disposed closest to the vehicle mounting portion 50 among the three holding portions, that is, the first holding portion 10, the second holding portion 20, and the third holding portion 30.

The first pipe 91 has a large diameter and a large amount of fluid flows therein, and is relatively likely to change in position. A large external force is likely to act on the first holding portion 10, which holds the first pipe 91, as compared with other portions of the vehicle pipe holder.

The vehicle mounting portion 50 is a portion that is mounted to the mounting end portion 95, and is a portion that is most firmly fixed in the vehicle pipe holder. In other words, the vehicle mounting portion 50 is a portion that is most unlikely to change in position in the vehicle pipe holder. In the vehicle pipe holder according to Embodiment 1, since the first holding portion 10 is arranged in the vicinity of the vehicle mounting portion 50, which is unlikely to change in position as described above, in the vehicle pipe holder according to Embodiment 1, the first holding portion 10 can be reinforced by the vehicle mounting portion 50 and the first pipe 91 can be stably held by the first holding portion 10.

According to the vehicle pipe holder according to Embodiment 1, it is possible to stably hold the first pipe 91 which has a large diameter, while keeping a small size. In the vehicle pipe holder according to Embodiment 1, the second holding portion 20, which holds the second pipe 92 having the second largest outer diameter among the first pipe 91 to the third pipe 93, is disposed on the opposite side of the first holding portion 10 with the mounting bracket 5 interposed therebetween. Therefore, the second pipe 92 is also disposed relatively close to the vehicle mounting portion 50 and is stably held.

As described above, the second pipe 92 held by the second holding portion 20 is pressed toward the first pipe 91 by the second elastic contact portion 24. Therefore, although the mounting bracket 5 is interposed between the first pipe 91 and the second pipe 92, the first pipe 91 and the second pipe 92 are stably bundled together by the vehicle pipe holder according to Embodiment 1.

In the vehicle pipe holder according to Embodiment 1, the peripheral portion of the insertion opening 61 in the peripheral wall cover portion 60 has an endless annular shape, but may also have an ended annular shape. That is, a slit may be provided in the peripheral portion of the insertion opening 61 in the peripheral wall cover portion 60, and the holding member 1 and the mounting bracket 5 may be assembled via the slit. In this case, workability of assembling the holding member 1 and the mounting bracket 5 is improved. In contrast, in the vehicle pipe holder according to Embodiment 1, by forming the peripheral portion of the insertion opening 61 in the peripheral wall cover portion 60 into the endless annular shape, it is possible to stably maintain the assembly state of the holding member 1 and the mounting bracket 5. In other words, in the vehicle pipe holder according to Embodiment 1, the assembly state of the holding member 1 and the mounting bracket 5 can be maintained at a high durability, and the first pipe 91 and the second pipe 92 can be held more stably.

Embodiment 2

Similar as the vehicle pipe holder according to Embodiment 1, a vehicle pipe holder according to Embodiment 2 is a member for holding three pipes arranged below a vehicle body of the vehicle.

Figure 5:
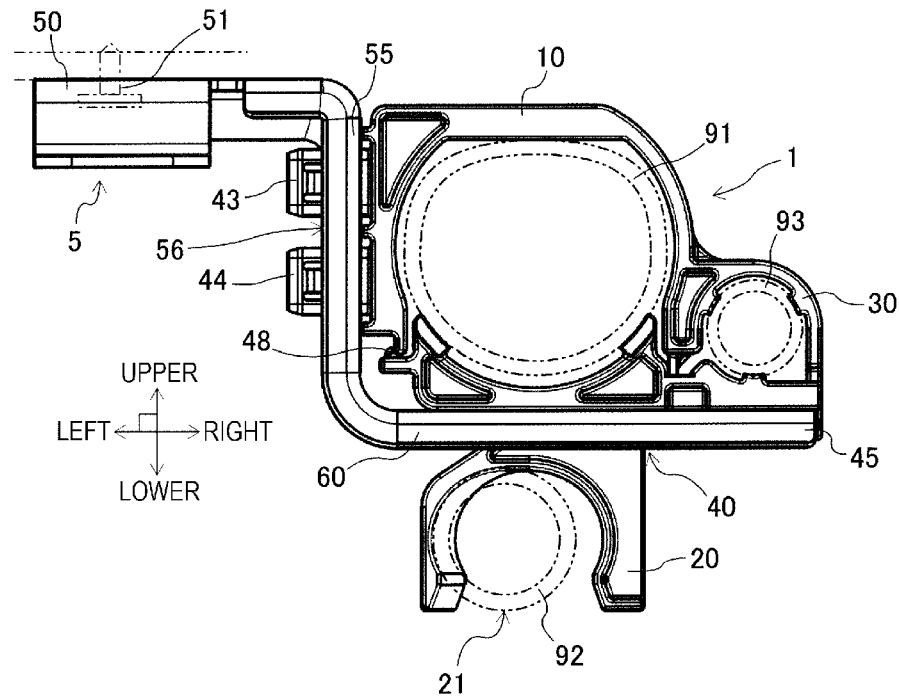
FIG. 5 is an explanatory view schematically showing a state in which a holding member and a mounting bracket in a vehicle pipe holder according to Embodiment 2 are assembled.
Figure 6:
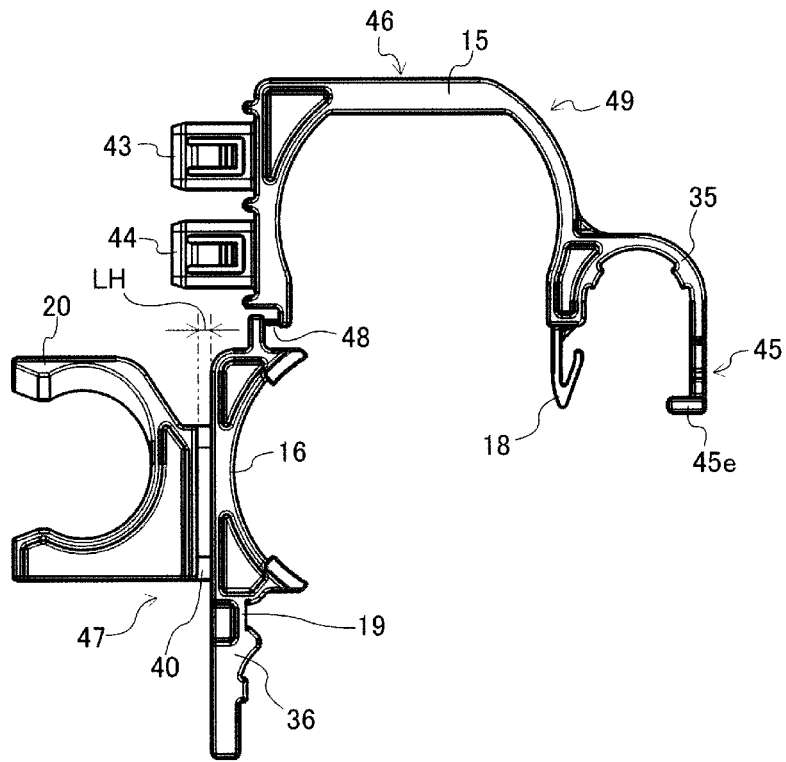
FIG. 6 is an explanatory view schematically showing a holding member intermediate in the vehicle pipe holder according to Embodiment 2.
Figure 7:
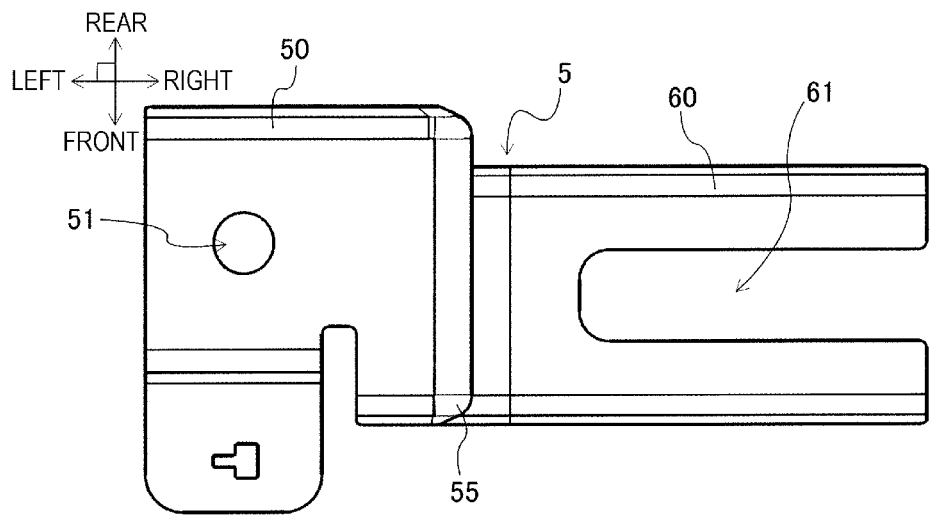
FIG. 7 is an explanatory view schematically showing the mounting bracket in the vehicle pipe holder according to Embodiment 2.
Figure 8:
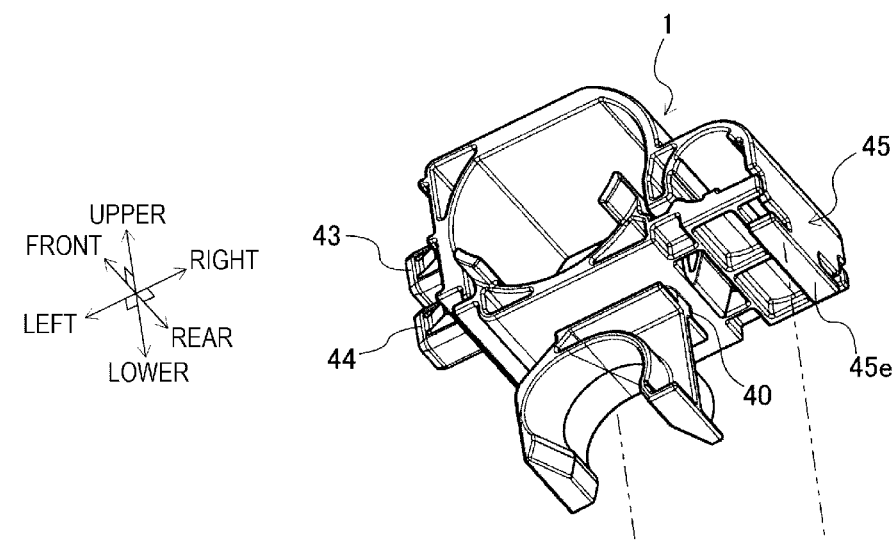
FIG. 8 is an explanatory view schematically showing a state in which a holding member and a mounting bracket in a vehicle pipe holder according to Embodiment 2 are being assembled.
Figure 8:
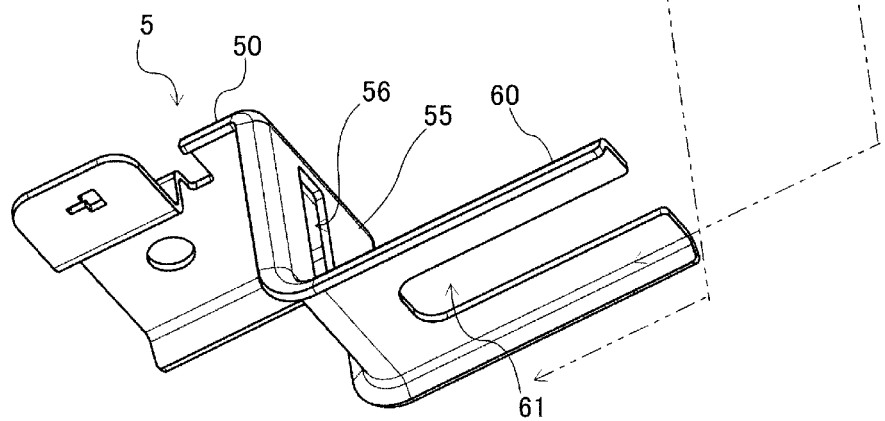

FIG. 5 is an explanatory view schematically showing a state in which a holding member and a mounting bracket in the vehicle pipe holder according to Embodiment 2 are assembled. FIG. 6 is an explanatory view schematically showing a holding member intermediate in the vehicle pipe holder according to Embodiment 2, and FIG. 7 is an explanatory view schematically showing the mounting bracket in the vehicle pipe holder according to Embodiment 2. FIG. 8 is an explanatory view schematically showing a state in which a holding member and a mounting bracket in a vehicle pipe holder according to Embodiment 2 are being assembled.

Hereinafter, in Embodiment 2, upper, lower, left, right, front, and rear respectively mean upper, lower, left, right, front, and rear shown in the drawings.

As shown in FIG. 5, similar as the vehicle pipe holder according to Embodiment 1, the vehicle pipe holder according to Embodiment 2 includes the holding member 1 and the mounting bracket 5, and is obtained by assembling the holding member 1 and the mounting bracket 5. Similar as Embodiment 1, the holding member 1 is made of POM, and the mounting bracket 5 is made of stainless steel.

As shown in FIG. 5, the holding member 1 includes the first holding portion 10, the second holding portion 20, the holding connection portion 40, the third holding portion 30, the first engaging claw 43, the second engaging claw 44, and a third engaging claw 45.

As shown in FIG. 6, the holding member 1 is configured with a holding member intermediate 49 with a so-called integral hinge shape, in which two parts formed integrally are integrated by a thin portion. One of the two portions is referred to as a first part 46 and the other is referred to as a second part 47. The thin portion connecting the first part 46 and the second part 47 is referred to as a hinge portion 48.

The first part 46 shown in FIG. 6 includes a substantially semiannular first main holding portion 15, a substantially semiannular third main holding portion 35, a holding member engaging claw 18, the first engaging claw 43, the second engaging claw 44, and the third engaging claw 45. The second part 47 has a substantially semiannular first sub holding portion 16, a substantially plate-shaped third sub holding portion 36, a holding member engaging hole 19, and the second holding portion 20. By bending the first part 46 and the second part 47 around the hinge portion 48, the holding member intermediate member 49 shown in FIG. 6 becomes the holding member 1 shown in FIG. 5.

More specifically, the first main holding portion 15 of the first part 46 and the first sub holding portion 16 of the second part 47 are combined to form the first holding portion 10, which has an endless substantially annular shape. The third main holding portion 35 of the first part 46 and the third sub holding portion 36 of the second part 47 are combined to form the third holding portion 30, which has an endless substantially annular shape. The third engaging claw 45, which has a claw shape, is provided at an end of the third main holding portion 35, and the third engaging claw 45 is engaged with an end portion of the third sub holding portion 36. The claw-like holding member engaging claw 18 is provided at a boundary portion between the first main holding portion 15 and the third main holding portion 35 in the first part 46. A holding member engaging hole 19 that has a through hole shape and that can engage with the holding member engaging claw 18 is provided at a boundary portion between the first sub holding portion 16 and the third sub holding portion 36 in the second part 47. As shown in FIG. 5, by engaging the holding member engaging claw 18 and the holding member engaging hole 19 and engaging the third engaging claw 45 with the end portion of the third sub holding portion 36, the first part 46 and the second part 47 are integrated, and the first holding portion 10 and the third holding portion 30 are fixed.

As shown in FIG. 5, a positional relationship between the first holding portion 10, the second holding portion 20, and the third holding portion 30 in the holding member 1 of the vehicle pipe holder according to Embodiment 2 is substantially the same as the positional relationship between the first holding portion 10, the second holding portion 20, and the third holding portion 30 in the holding member 1 of the vehicle pipe holder according to Embodiment 1. In the holding member 1 shown in FIG. 5, the first pipe 91 is held by the first holding portion 10, the second pipe 92 is held by the second holding portion 20, and the third pipe 93 is held by the third holding portion 30.

It can be said that the first holding portion 10 and the third holding portion respectively sandwich and hold the first pipe 91 and the third pipe 93 when the first part 46 and the second part 47 are integrated as described above.

The second holding portion 20 has a substantially C-like annular shape having the second slit 21 in the peripheral wall thereof. The second slit 21 is disposed below the second holding portion 20.

The first engaging claw 43 and the second engaging claw 44 are arranged on the upper and lower sides of each other, and protrude further leftward from a left end of the first main holding portion 15.

As shown in FIG. 6, the holding connection portion 40 is located between the first sub holding portion 16 and the second holding portion 20 of the second part 47. The holding connection portion 40 is a part connecting the first holding portion 10 and the second holding portion 20 in the holding member 1 shown in FIG. 5. The length LH of the holding connection portion 40 of Embodiment 2 shown in FIG. 6 is 5 mm.

As shown in FIGS. 5 and 8, the mounting bracket 5 is separate from the holding member 1 and has a substantially plate shape. The mounting bracket 5 includes the vehicle mounting portion 50, the first assembling portion 55, and the peripheral wall cover portion 60.

The vehicle mounting portion 50 has a substantially flat plate shape extending in the left-right direction, and has the mounting hole 51 penetrating the vehicle mounting portion 50 in the thickness direction thereof as shown in FIG. 7.

As shown in FIGS. 5 and 7, the first assembling portion 55 has a substantially flat plate shape extending in the upper-lower direction and is continuous to a right side of the vehicle mounting portion 50. The first assembling portion 55 has the first engaging hole 56 which extends in the up-down direction and penetrates the first assembling portion 55 in the thickness direction thereof.

As shown in FIG. 5, the peripheral wall cover portion 60 has a substantially flat plate shape extending in the left-right direction and is continuous to a right side of the first assembling portion 55. As shown in FIGS. 7 and 8, the peripheral wall cover portion 60 has an insertion opening 61 extending in the left-right direction and penetrating the peripheral wall cover portion 60 in the thickness direction thereof.

As shown in FIG. 7, the peripheral portion of the mounting hole 51 in the vehicle mounting portion 50 has an endless annular shape. As shown in FIG. 8, the peripheral portion of the first engaging hole 56 in the first assembling portion 55 also has an endless annular shape. On the other hand, as shown in FIGS. 7 and 8, the insertion opening 61 has a slit shape communicating with an outside on a right side. Therefore, it can be said that the peripheral portion of the insertion opening 61 in the peripheral wall cover portion 60 has an ended annular shape.

As shown in FIG. 5, in the vehicle pipe holder according to Embodiment 2 as well, upon assembly of the holding member 5 and the mounting bracket 5, the holding connection portion 40 of the holding member 1 is inserted into the insertion opening 61 of the mounting bracket 5. Therefore, the mounting bracket 5 is disposed between the first holding portion 10 and the second holding portion 20, and the vehicle pipe holder is reinforced from an inside thereof by the mounting bracket 5. Therefore, in the vehicle pipe holder according to Embodiment 2 as well, the strength of the entire vehicle pipe holder is improved, and the vehicle pipe holder can be reduced in size.

Upon assembly of the holding member 1 and the mounting bracket 5 in the vehicle pipe holder according to Embodiment 2, as shown in FIG. 8, the holding connection portion 40 of the holding member 1 is placed on the right side of the insertion opening 61 of the mounting bracket 5 having the slit shape, and the holding member 1 is slid leftward. Then, in a state where the holding connection portion 40 of the holding member 1 is inserted into the insertion opening 61, the first engaging claw 43 and the second engaging claw 44 of the holding member 1 are inserted into the first engaging hole 56 of the mounting bracket 5, and the first engaging claw 43 and the second engaging claw 44 are engaged with the first engaging hole 56. Further, when the holding member 1 is slid leftward as described above, not only the holding connection portion 40 but also a lower end portion 45e of the third engaging claw 45 are inserted into the insertion opening 61 of the mounting bracket 5, and the lower end portion 45e is engaged with the insertion opening 61. Therefore, in the vehicle pipe holder according to Embodiment 2, when the holding member 1 and the mounting bracket 5 are assembled, the first part 46 and the second part 47 of the holding member 1 are integrated more firmly by the mounting bracket 5.

In the vehicle pipe holder according to Embodiment 2, the first holding portion 10 and the third holding portion 30 each have an endless annular shape. Therefore, the first pipe 91 and the third pipe 93 are held more stably by the first holding portion 10 and the third holding portion 30.

In the vehicle pipe holder according to Embodiment 2, by bending the first part 46 and the second part 47, and engaging the holding member engaging claw 18 of the third main holding portion 35 and the holding member engaging hole 19 of the third sub holding portion 36, the holding member 1 in which the first part 46 and the second part 47 are integrated is formed.

The holding member 1 in the vehicle pipe holder according to Embodiment 2 is made of POM, which is relatively hard, and thus may be damaged in the vicinity of the hinge portion 48 during folding upon manufacture of the vehicle pipe holder or during conveyance in a state of the holding member intermediate 49 having an integral hinge shape. However, in the vehicle pipe holder according to Embodiment 2, as described above, since the first part 46 and the second part 47 of the holding member 1 are firmly integrated by the mounting bracket 5, even if the holding member 1 is broken in the vicinity of the hinge portion 48 and is divided into the first part 46 and the second part 47, there is no great influence on the pipe holding function of the vehicle pipe holder according to Embodiment 2.

The present invention is not limited to the embodiments described above and illustrated in the drawings, and can be appropriately modified without departing from the scope of the invention. In addition, any of the structural elements described in this specification including the embodiments can be extracted and combined.

What is claimed is:

1. A vehicle pipe holder configured to hold two or more pipes in a vehicle, the vehicle pipe holder comprising:
   a holding member that is made of resin and that includes a first holding portion configured to hold one of the pipes, a second holding portion configured to hold another one of the pipes, and a holding connection portion that couples the first holding portion and the second holding portion; and
   a mounting bracket that is made of metal, that is separate from the holding member, and that includes a vehicle mounting portion configured to be mounted to a vehicle and an insertion opening configured to be inserted with the holding connection portion,
   wherein
   the mounting bracket is configured to be disposed between the first holding portion and the second holding portion upon assembly of the holding member and the mounting bracket,
   the first holding portion is disposed on an inner side of the mounting bracket,
   the second holding portion is disposed on an outer side of the mounting bracket,
   when the second holding portion and the holding connection portion are inserted into the insertion opening, the mounting bracket and the holding member are integrated,
   the first holding portion is located on a first side of the insertion opening, and
   the second holding portion is located on a second side of the insertion opening opposite the first side of the insertion opening.

2. The vehicle pipe holder according to claim 1,
   wherein a peripheral portion of the insertion opening of the mounting bracket has an endless annular shape.

3. The vehicle pipe holder according to claim 1,
   wherein the first holding portion has a C-like annular shape having a first slit in a peripheral wall of the first holding portion, and
   wherein the mounting bracket includes a peripheral wall cover portion configured to cover the first slit upon the assembly.

4. The vehicle pipe holder according to claim 3,
   wherein the holding member and the mounting bracket are configured to be fixed to each other at two positions between which the first slit of the holding member and the peripheral wall cover portion of the mounting bracket are interposed.

5. A vehicle pipe holder configured to hold two or more pipes in a vehicle, the vehicle pipe holder comprising:
   a holding member that is made of resin and that includes a first holding portion configured to hold one of the pipes, a second holding portion configured to hold another one of the pipes, and a holding connection portion that couples the first holding portion and the second holding portion; and
   a mounting bracket that is made of metal, that is separate from the holding member, and that includes a vehicle mounting portion configured to be mounted to a vehicle and an insertion opening configured to be inserted with the holding connection portion,
   wherein
   the mounting bracket is configured to be disposed between the first holding portion and the second holding portion upon assembly of the holding member and the mounting bracket,
   the first holding portion is disposed on an inner side of the mounting bracket, and
   the second holding portion is disposed on an outer side of the mounting bracket.

6. The vehicle pipe holder according to claim 5,
   wherein a peripheral portion of the insertion opening of the mounting bracket has an endless annular shape.

7. The vehicle pipe holder according to claim 5,
   wherein the first holding portion has a C-like annular shape having a first slit in a peripheral wall of the first holding portion, and
   wherein the mounting bracket includes a peripheral wall cover portion configured to cover the first slit upon the assembly.

8. The vehicle pipe holder according to claim 7,
wherein the holding member and the mounting bracket are configured to be fixed to each other at two positions between which the first slit of the holding member and the peripheral wall cover portion of the mounting bracket are interposed.

9. The vehicle pipe holder according to claim 1, wherein
when the second holding portion and the holding connection portion are inserted into the insertion opening, the mounting bracket and the holding member are integrated,
the first holding portion is located on a first surface side of the mounting bracket, and
the second holding portion is located on a second surface side of the mounting bracket different from the first surface side.

* * * * *